(12) United States Patent
Nalbant

(10) Patent No.: US 9,577,438 B2
(45) Date of Patent: Feb. 21, 2017

(54) WIRELESS POWER SYSTEM

(71) Applicant: Integrated Device Technology, Inc., San Jose, CA (US)

(72) Inventor: Mehmet K. Nalbant, Cupertino, CA (US)

(73) Assignee: INTEGRATED DEVICE TECHNOLOGY INC, San Jose, CA (US)

(\*) Notice: Subject to any disclaimer, the term of this patent is extended or adjusted under 35 U.S.C. 154(b) by 0 days.

(21) Appl. No.: 14/671,444

(22) Filed: Mar. 27, 2015

(65) Prior Publication Data

US 2015/0280452 A1 Oct. 1, 2015

Related U.S. Application Data

(60) Provisional application No. 61/971,219, filed on Mar. 27, 2014.

(51) Int. Cl.
| | | |
|---|---|---|
| *H02J 17/00* | (2006.01) | |
| *H02J 5/00* | (2016.01) | |
| *H01F 38/14* | (2006.01) | |
| *H02M 3/335* | (2006.01) | |
| *H04B 5/00* | (2006.01) | |
| *H02M 7/217* | (2006.01) | |

(52) U.S. Cl.
CPC ............ *H02J 5/005* (2013.01); *H01F 38/14* (2013.01); *H02M 3/33576* (2013.01); *H02M 7/217* (2013.01); *H04B 5/0037* (2013.01); *H04B 5/0093* (2013.01); *Y02B 70/1441* (2013.01)

(58) Field of Classification Search
CPC . H02J 5/005; H02J 7/025; H02J 17/00; H01F 38/14; B60L 11/182; H04B 5/0037; H02M 3/33576

USPC ........................................................ 307/104
See application file for complete search history.

(56) References Cited

U.S. PATENT DOCUMENTS

| | | | |
|---|---|---|---|
| 5,939,830 A * | 8/1999 | Praiswater | 315/169.3 |
| 2005/0068792 A1* | 3/2005 | Yasumura | 363/21.06 |
| 2009/0096413 A1* | 4/2009 | Partovi et al. | 320/108 |
| 2010/0148723 A1 | 6/2010 | Cook et al. | |
| 2010/0164295 A1* | 7/2010 | Ichikawa et al. | 307/104 |

(Continued)

FOREIGN PATENT DOCUMENTS

WO 2013/114978 8/2013

OTHER PUBLICATIONS

International Search Report for PCT Application no. PCT/US2015/023132 issued by the US Searching Authority on Jul. 7, 2015, Corresponding Ref. No. 70107.413W001, pp. 1-2.

(Continued)

*Primary Examiner* — Thienvu Tran
*Assistant Examiner* — Kevin J Comber
(74) *Attorney, Agent, or Firm* — Hayes and Boone LLP

(57) ABSTRACT

The present disclosure relates wireless power transfer. In some embodiments, DC power is received through one or more inductors and switched to provide alternating current through a TX coil with a pair of power FETs coupled between opposite sides of the TX coil and ground such that current flows through one of the pair of FETs at a time. In some embodiments, the pair of FETs can be driven in adaptive resonant mode to operate at a resonance. In some embodiments, the pair of FETs are driven at a particular frequency.

15 Claims, 13 Drawing Sheets

(56) References Cited

U.S. PATENT DOCUMENTS

| | | |
|---|---|---|
| 2010/0184371 A1* | 7/2010 | Cook et al. |
| 2012/0039102 A1 | 2/2012 | Shinoda |
| 2013/0193773 A1* | 8/2013 | Van Wageningen .......... 307/104 |
| 2013/0249479 A1 | 9/2013 | Partovi |
| 2014/0247192 A1 | 9/2014 | Ikemoto |
| 2015/0035376 A1* | 2/2015 | Baarman et al. ............. 307/104 |

OTHER PUBLICATIONS

Written Opinion for PCT Application No. PCT/US2015/023132 issued by the US Searching Authority on Jul. 7, 2015, Corresponding Ref. No. 70107.413W001, pp. 1-5.

\* cited by examiner

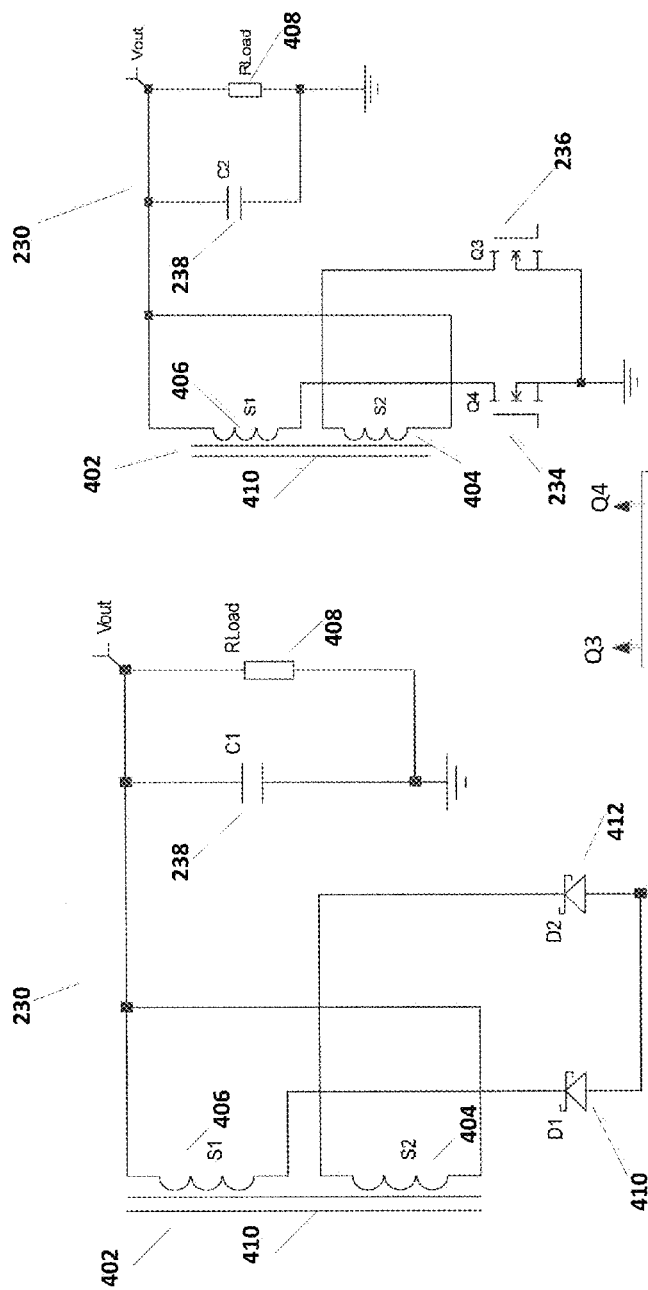
Figure 4A
Figure 4B
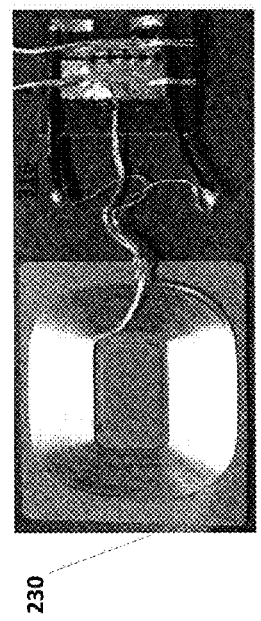
Figure 4C

WIRELESS POWER SYSTEM

RELATED APPLICATIONS

The present application claims priority to U.S. Provisional Application Ser. No. 61/971,219, filed on Mar. 27, 2014, which is herein incorporated by reference in its entirety.

BACKGROUND

1. Technical Field

The present disclosure relates to wireless power transmission systems.

2. Discussion of Related Art

Most wireless power systems use voltage fed power stages, as is illustrated in FIG. 1. The present power processing stages that are used in the WPC qi standard as well as other standards are voltage fed architectures, with either half or full-bridge technologies. FIG. 1 illustrates a standard full-bridge wireless power transmitter (TX)/receiver (RX) system.

As is shown in FIG. 1, system 100 includes a transmitter (TX) 132 and a receiver (RX) 134. Transmitter 132, as shown in FIG. 1, includes a DC power source 102 that is coupled across a full bridge formed by transistors 104, 106, 110 and 112. The gates of transistors 104, 106, 110 and 112 are driven by a controller 134 such that transistors 104 (Q2) and 112 (Q3) are turned on when transistors 106 (Q1) and 110 (Q4) are turned off and transistors 106 (Q1) and 110 (Q4) are turned on when transistors 104 (Q2) and 112 (Q3) are turned off. The bridge formed by transistors 104, 106, 110 and 112 is driven at a frequency determined by controller 134, and may be at or near a set frequency. TX coil 114 transmits the power to a RX coil 118 in RX 134.

RX 134 is similarly configured to TX 132. Power received in RX 118 is rectified by the bridge circuit formed by transistors 120 (Q2r), 122 (Q1r), 126 (Q4r), and 128 (Q3r). The gates of transistors 120, 122, 126, and 128 are activated by controller 136 in order to produce DC voltage Vout across capacitor 130. As such, transistors 120 and 128 are turned on/off at the same time that transistors 122 and 126 are turned off/on and at a frequency that substantially matches the frequency set by controller 134.

Current path 134, which indicates both the resonant and load currents, includes the switching currents and consequently flows through two series connected switching field-effect transistors (FETs). Similarly, current path 132 flow through two series connected FETs as well. These, therefore, represent large "lossy" circulating currents through the switching FETs when near resonance operation, near full load, and/or during low TX/RX coupling characteristics. Further, controllers 134 and 136 represent may include highly complex gate drive circuitry. In some cases, the switching is further complicated such that zero voltage switching (ZVS) can be achieved.

Consequently, a large shortcoming in conventional wireless power transmission circuits is the circulation of the resonant currents of the TX coil 115 through the power FETs 104, 106, 110 and 112. At less than ideal transmitter-receiver (TX-RX) coupling placements, these currents can be very high, even at power transmissions of 5 W, and can produce large losses in the power FETs. These losses are proportional to the square of the root-mean-square (RMS) of the resonant currents. This results in very high losses in the power FETs. In addition, control circuitry can be very complex because the power FETs are not ground referenced. Additionally, even though the power FETs 104, 106, 110 and 112 are capable of being zero-voltage switched, special steps have to be taken and additional parts have to be used to exploit the beneficial properties of Zero Voltage Switching.

Therefore, there is a need for better transmitters and receivers to affect a wireless transmission system.

SUMMARY

In accordance with some embodiments, a transmitter and receiver for wireless power transfer is presented. A transmitter according to some embodiments includes a TX coil; a capacitor coupled across the TX coil; at least one inductor coupled between a power source and the TX coil; and a pair of switching FETs including a first switching FET coupled between a first side of the capacitor and ground and a second switching FET coupled between a second side, opposite the first side, of the capacitor and ground, the gates of the first switching FET and the second switching FET being driven to provide an oscillating current through the TX coil.

A receiver according to some embodiments includes a RX coil; a rectifier coupled across the RX coil; and a capacitor coupled between the RX coil and ground.

A method of wirelessly transmitting power according to some embodiments includes receiving DC power through one or more inductors; and switching the DC power to provide alternating current through a TX coil with a pair of power FETs coupled between opposite sides of the TX coil and ground such that current flows through one of the pair of FETs at a time.

These and other embodiments will be described in further detail below with respect to the following figures.

BRIEF DESCRIPTION OF THE DRAWINGS

FIGS. 4A, 4B and 4C illustrate a wireless receiver according to some embodiments.

The drawings may be better understood by reading the following detailed description.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Some embodiments of the present invention use current-fed power stages, which have a number of very favorable characteristics that make them beneficial when used in wireless power transmission circuits and applications. Some embodiments of the present invention use an Adaptive Resonant (AR) operation. In AR operation, the power circuit, with all the resonant components (inductors, capacitors, resistors and other loads) connected to its switching nodes, self-determines its natural resonate frequency and operates at the frequency for a substantial time of its operation. The AR circuit is applicable in wireless power transfer among other types of power transfer. For example, some embodiments of AR transceivers increases the efficiency of the transceiver system by more than 10% (DC to DC transfer) when compared to the best alternative technologies. Therefore, a wireless power transmission system according to some embodiments can exhibit high efficiency, efficient power control, and are conducive to power circuit implementations.

Implementation costs directly or indirectly are related to the cost of power handling silicon switches. Topologies that make more efficient use of power switch capability ultimately hold promise for better performance and cost advantage. In some cases, efficiency is related to the number of switches carry the current in the transceiver. In some embodiments of the present invention, as is further shown below, only one power switch carries the current resulting in a greater overall efficiency.

Figure 2A:
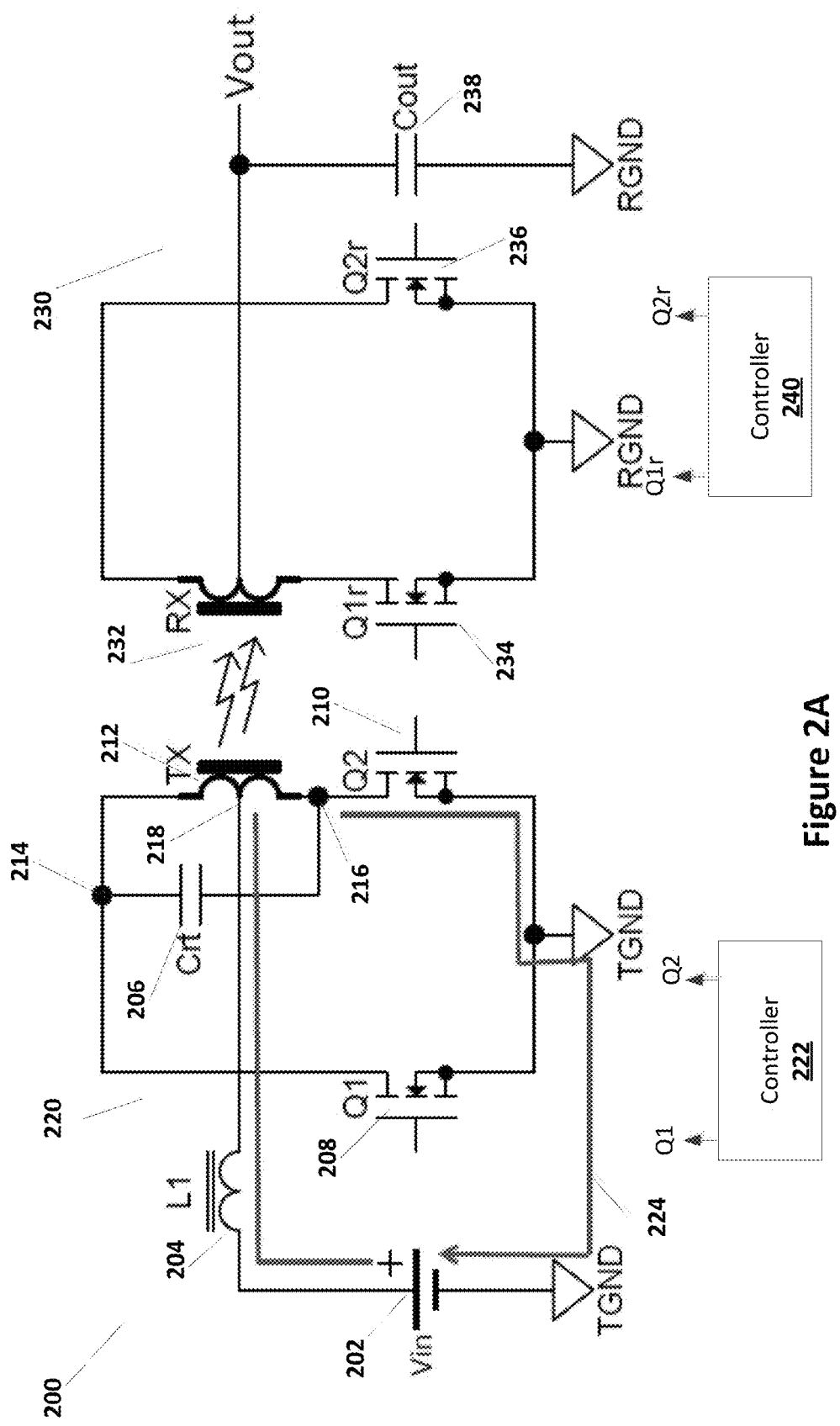
FIG. 2A illustrates a wireless transmission system according to some embodiments.
Figure 2B:
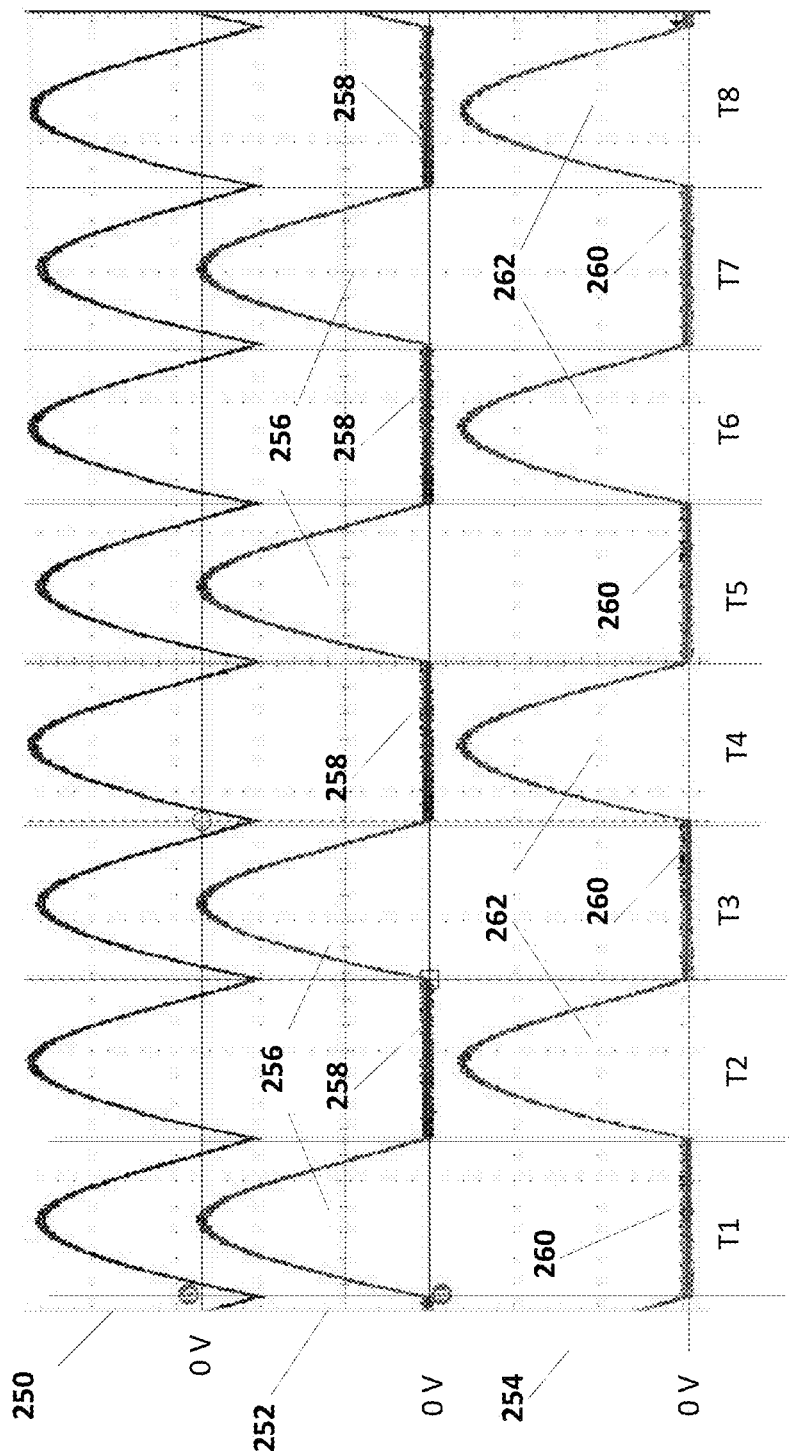
FIG. 2B illustrates operation of a wireless transmitter as shown in FIG. 2A.

FIGS. 2A and 2B illustrate a transceiver system 200 according to some embodiments. As shown in FIG. 2A, transceiver system 200 includes a transmitter 220 and a receiver 230. As shown in FIG. 2A, transmitter 220 receives DC power from source 202 into inductor 204. Inductor 204 is coupled to a center-tap 218 of TX coil 212. A capacitor 206 is coupled across the outer taps of TX coil 212. A first FET transistor 208 (Q1) is coupled between one side of capacitor 206 at node 214 to ground while a second FET transistor 210 (Q2) is coupled between the other side of capacitor 206 at node 216 and ground. The gates of transistors 208 and 210 are driven by controller 222.

Inductor 204 prevents large resonant currents out of the resonant circuit formed by capacitor 206 and TX coil 212. Further, only one switching FET at a time carries the current path.

Power transmitted by TX coil 212 is received by RX coil 232 in receiver 230. As shown in FIG. 2A, RX coil 232 has a center-tap that is coupled to capacitor 238 and which provides the output voltage Vout. A first side of RX coil 232 is coupled through FET transistor 234 (Q1r) to ground while a second side of RX coil 232 is coupled through FET transistor 236 (Q2r) to ground. The gates of transistors 234 and 236 are driven by controller 240.

As is illustrated in FIG. 2A, current path 224 only passes through one FET transistor. In the particular example shown in FIG. 2A, current path 224 shows the current when transistor 210 is on and transistor 208 is off. Although controller 222 can drive switching transistors 208 and 210 at any frequency, in some embodiments controller 222 operates in an AR mode. In AR mode, switching transistors 208 and 210 are switched when the voltage on the drain decreases to zero volts, which is also in line with ZVS operation.

FIG. 2B illustrates operation of an example transmitter 220 in AR mode. Waveform 250 illustrates the voltage on center-tap 218 of TX coil 212 in TX 220. Waveform 252 is the voltage at node 216, corresponding to the drain of FET 210, in TX 220. Waveform 254 is the voltage at node 214, corresponding to the drain of FET 208, in TX 220. As shown in waveforms 254 and 252, switching of FETs 208 and 210 occur at 0 crossings of the voltage on the drain of FETs 208 and 210. As shown in FIG. 2B, waveform 252 shows time periods 256 where FET 210 is off and periods 258 where FET 210 is on (driving the voltage at node 216 to ground). Similarly, waveform 254 shows periods 260 where FET 208 is on (driving the voltage at node 214 to ground) and periods 262 when FET 208 is off. Consequently, in periods T1, T3, T5, and T7, FET 208 is on and FET 210 is off and in periods T2, T4, T6, and T8, FET 208 is off and FET 210 is on. In an AR mode, time period T1 switches to time period T2 when waveform 252 reaches 0 volts. Time period T2 switches to time period T3 when waveform 254 reaches 0 volts. Controller 222 monitors the voltages of waveforms 252 and 254 and switches FETs 208 and 210 when the voltage across the off transistor transitions to 0 V. Waveform 250 shows the resulting voltage at the center tap 218 of TX coil 212. Since the time periods are determined by the resonance of the system, transmitter 220 then operates substantially at resonant frequency.

Although FIG. 2B illustrates operation of transmitter 220 in AR mode, controller 220 can drive FETS 208 and 210 in an off-resonance fashion. The resulting operation is less efficient than operating in AR mode. For example, controller 220 can drive FETs 208 and 210 at a frequency that is received remotely. Such a frequency may be off the naturally resonant frequency that results from operation in AR mode.

Figure 3:
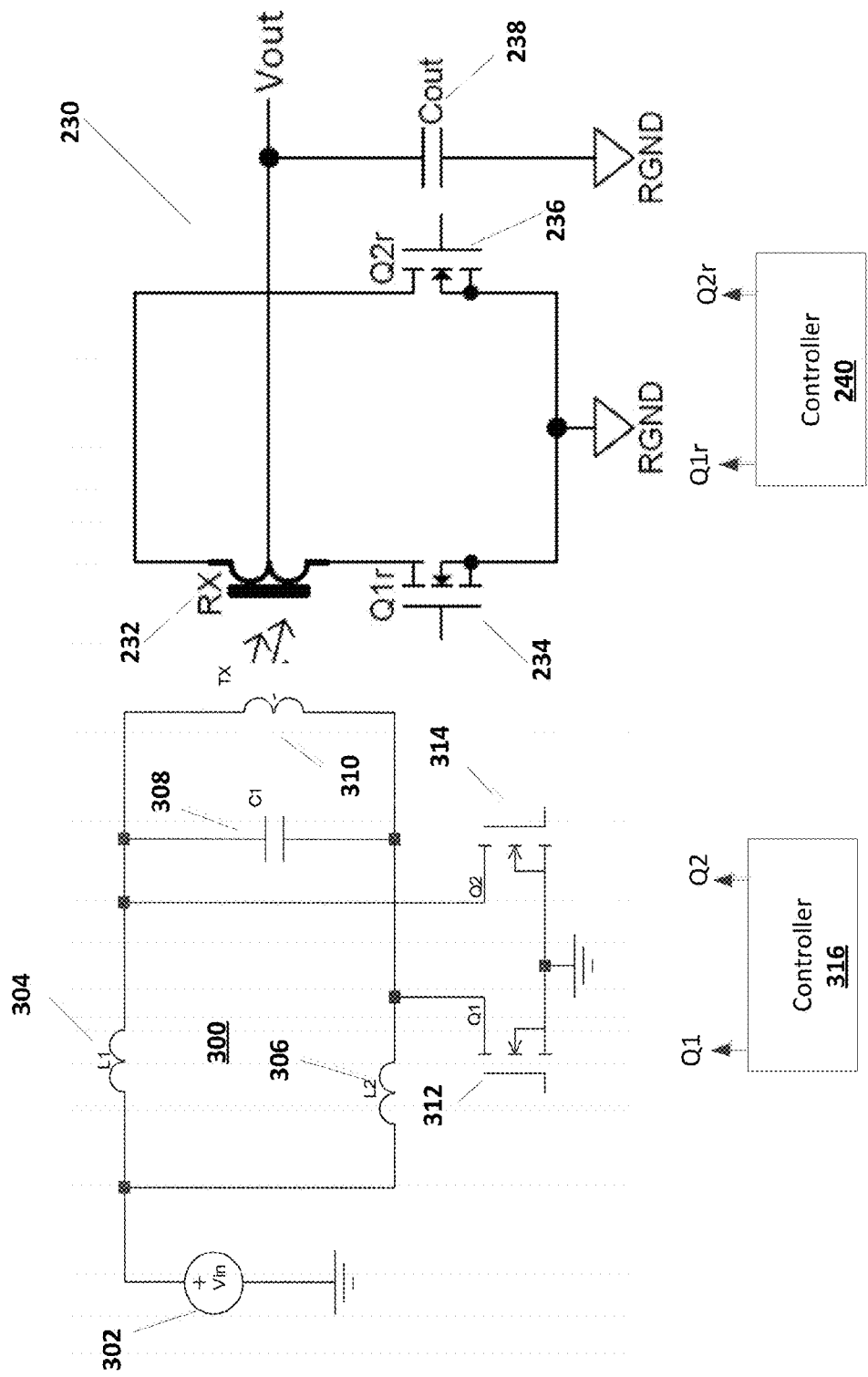
FIG. 3 illustrates another example of a wireless transmitter according to some embodiments.

FIG. 3 illustrates a transmitter 300 according to some embodiments. Transmitter 300 is appropriate when TX coil 310 does not include a center-tap or where center-tapping is not convenient or possible. As shown in FIG. 3, a power source 302 provides DC power through inductor 304 (L1) to one side of TX coil 310 and through inductor 306 (L2) to the opposite side of TX coil 310. A capacitor 308 is connected across TX coil 310. An FET 312 (Q1) is coupled between inductor 306 and ground. An FET 314 is coupled between inductor 304 and ground. FETs 312 and 314 are switched by a controller 316 as discussed above to provide a time varying current through TX coil 310. In some embodiments, FETs 312 and 314 are switched in an AR mode as discussed with FIG. 2B. As is further shown in FIG. 3, transmitter 300 can operate with receivers such as receiver 230 as illustrated in FIG. 2A.

As illustrated in FIG. 2A and FIG. 3, AR enables the power stages to operate at the equivalent resonant frequency of the reactive components connected to the drains of the two power FETs Q1 and Q2 (shown as FETs 208 and 210 in FIG. 2A and FETs 312 and 314 in FIG. 3). Adaptive self-resonance (AR) is advantageous as it allows the power FETs (FETs 208 and 210 in FIG. 2A and FETs 312 and 314 in FIG. 3) to operate under substantially zero-voltage switching conditions that in turn substantially eliminate switching power losses and result in substantially lower electro magnetic interference (EMI) generation. The waveforms at the drains of the power FETs (FETs 208 and 210 in FIG. 2A and FETs 312 and 314 in FIG. 3) look sinusoidal for a substantial part of their respective switching cycles, until the FETs are turned on as illustrated in FIG. 2B. In some embodiments, the AR is accomplished with voltage feedback from the drains of the power FETs, however other feedback points may be utilized as well.

FIG. 4A shows another example of receiver 230 according to some embodiments. Receiver 230 can operate, for example, with transmitter 220 as shown in FIG. 2A. In the embodiment shown in FIG. 4A illustrates a similar configuration as that shown in receiver 230 illustrated in FIG. 2A. Coil 402, which replaces RX coil 232, includes two RX coils, coils 406 and 404. Coils 404 and 406 are coupled along a core 410 in series. The center tap illustrated in FIG. 2A is formed at Vout where coils 406 and 404 are connected. The opposite side of coil 404 is connected through FET 236 and the opposite side of coil 406 is coupled through FET 234 to ground. As further shown, capacitor 238 is coupled between Vout and ground. A load 408 is shown between Vout and Ground. Load 408 represents the device being charged. FETs 234 and 236 are switched by a controller 414, which operates as described above with respect to FIG. 2A to provide a DC voltage at Vout. Receiver 230 illustrated in FIG. 4A uses receiver side ground reference power FETs 234 and 236 coupled to a center-tapped RX coil 402. The power FETs 234 and 236 configured as shown is advantageous as it allows FETs 234 and 236 to be easily drive by gate source signals from a RX controller 414 that is also RX ground referenced.

FIG. 4B illustrates another example where FETs 234 and 236 are replaced with diodes 410 and 412, respectively. FIG. 4C shows a picture of the example of receiver 230 shown in FIG. 4B.

Figure 5:
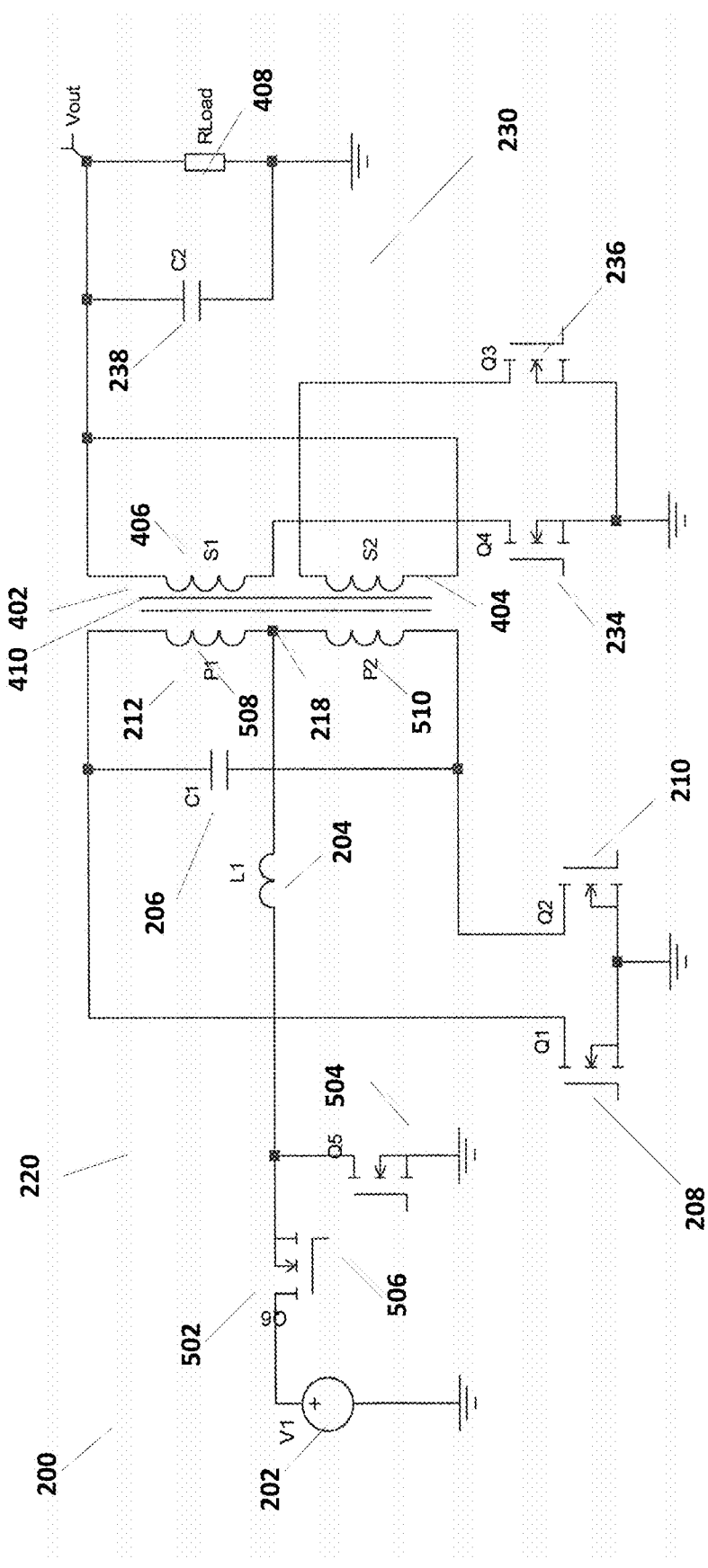
FIG. 5 illustrates another example of a wireless transceiver system according to some embodiments.

FIG. 5 illustrates an embodiment of transceiver 200 as illustrated in FIG. 2A. The example of RX 230 provided is discussed with FIG. 4A. TX 220 is the same as that discussed in FIG. 2A. As shown in FIG. 5, however, TX coil 212 includes two coils 508 and 510 coupled in series where the center between them forms center-tap 218. Additionally, a buck-boost 506 is added between voltage source 202 and inductor 204. Buck-boost 506 includes FET transistors 504 and 506 that are oppositely driven to provide a square wave at inductor 204. Buck-boost 506 can help to reduce EMI.

Figure 6:
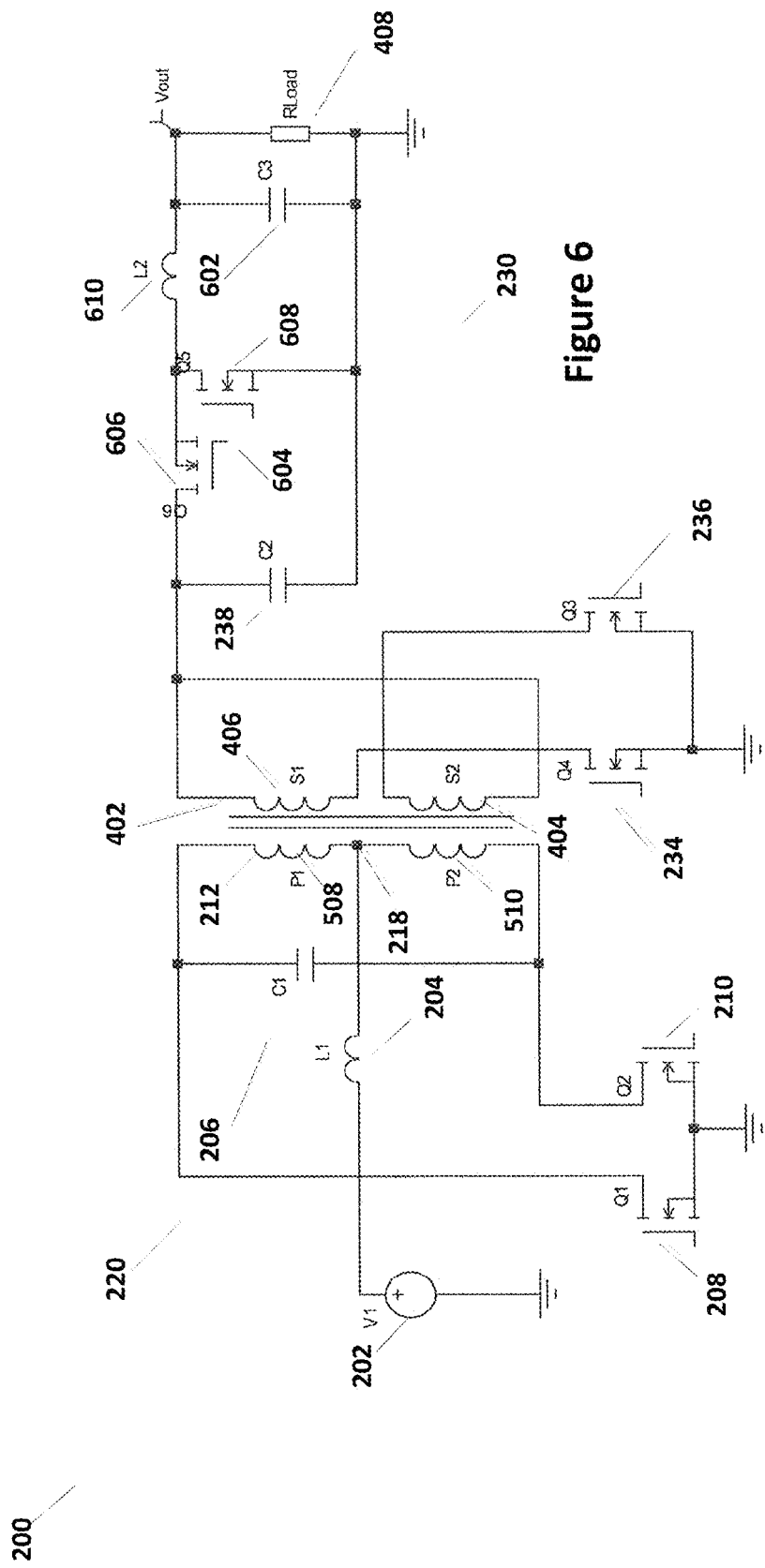
FIG. 6 illustrates another example of a wireless transceiver system according to some embodiments.

FIG. 6 illustrates another embodiment of transceiver 200 as illustrated in FIG. 2A. As was discussed in FIG. 5, TX coil 212 includes two coils 508 and 510 coupled in series where the center between them forms center-tap 218. Receiver 230 is similar to that discussed in FIG. 4A. However, a buck-boost circuit 604 is applied across capacitor 238. Buck-boost circuit 604 includes FETs 606 and 608 that are alternately activated to provide a square wave to inductor 610. The signal through inductor 610 charges capacitor 602, which is coupled across load 408. Buck-boost circuit 604, along with inductor 610, can provide regulation of the output voltage. Further, buck-boost circuit 604 can operate in zero-voltage switching mode, which provides substantial advantages in reducing EMI.

Figure 7:
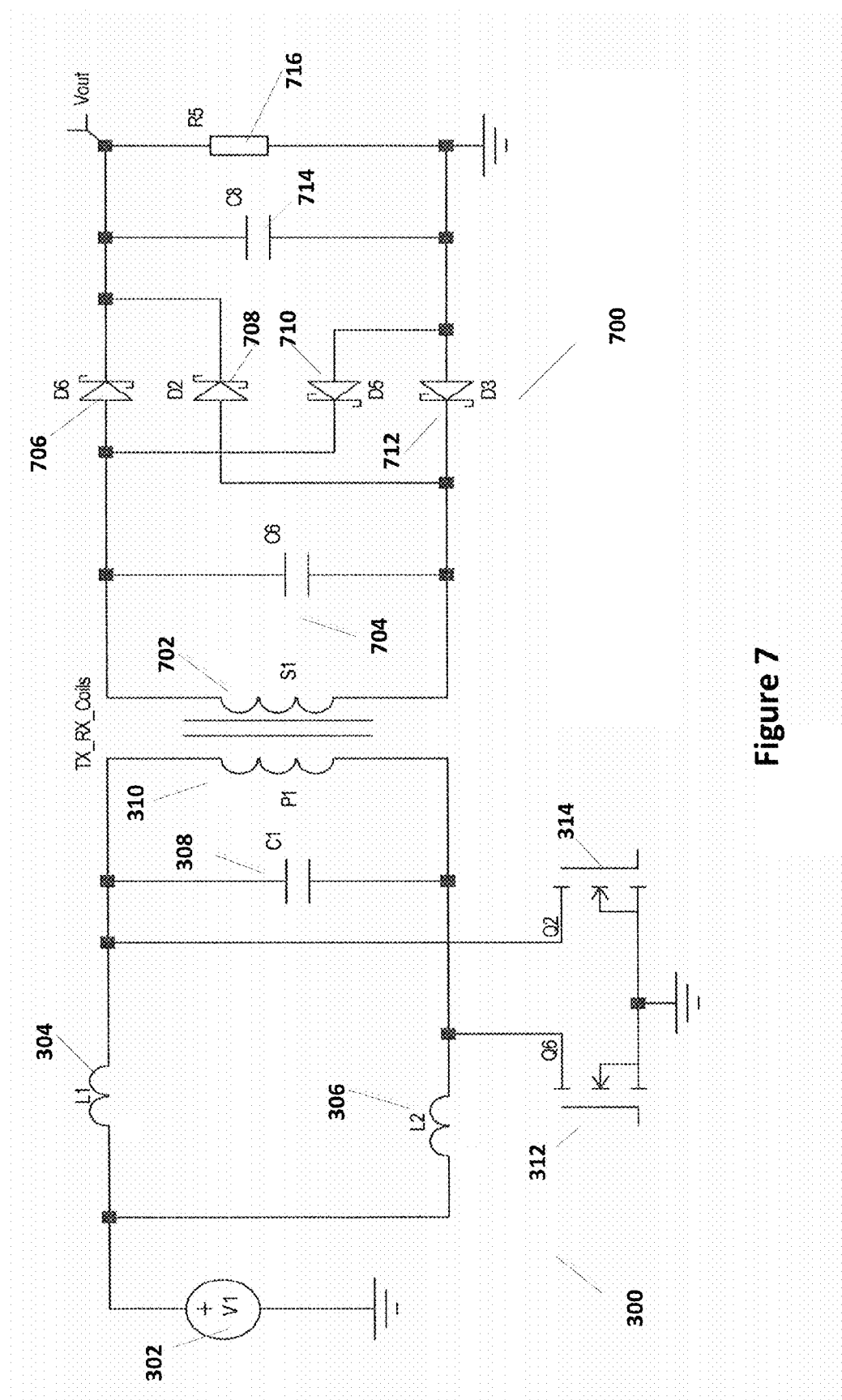
FIG. 7 illustrates another example of a wireless transceiver system according to some embodiments.

FIG. 7 illustrates a receiver 700 that can be used with transmitter 300 as illustrated in FIG. 3. As shown in FIG. 7, power is received in coil 702. A capacitor 704 is positioned across coil 702. A rectifier bridge formed by diodes 706, 708, 710, and 712 are coupled across capacitor 704. A capacitor 714 is coupled to receive the DC voltage from the rectifier bridge formed by diodes 706, 708, 710 and 712. A load 716 is coupled across capacitor 714, which provides the output voltage Vout.

Figure 8:
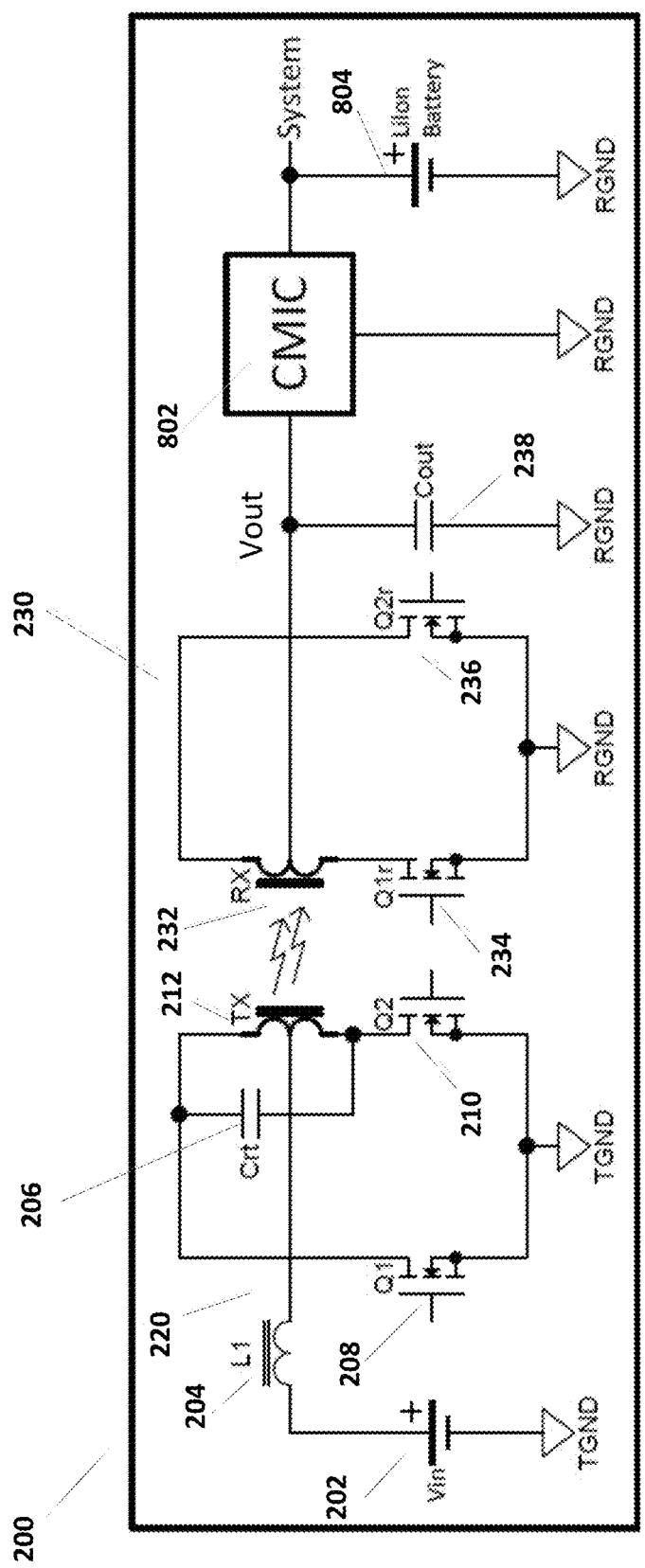
FIG. 8 illustrates another example of a wireless transceiver system according to some embodiments.

FIG. 8 illustrates an example of transceiver system 200 as illustrated in FIG. 2A. In the example illustrated in FIG. 8, the output voltage Vout is input to a configurable mixed-signal IC (CMIC) charger circuit 802. Charger circuit 802, then, can be provide a power to charge a battery 804 as well as to supply system voltage. In some embodiments, CMIC 802 can have a voltage range of about 4.7 V to about 10 V.

There are a number of apparent advantages of the embodiments of transmitter and receiver circuits illustrated in the figures discussed above. For example, only one FET switch carries the current at a time, which increases the efficiency. All of the resonant V-A circulates in the L-C tank circuit of the transmitter and flows through a single FET, resulting in significantly lower switching currents through the FETs. Further, operated in AR mode, the transmitter always operates in resonance. This reduces the need for tightly tolerance components resulting in lower cost devices with better and more predictable power transfer characteristics. Furthermore, the RX voltages become much more deterministic. The TX and RX side maximum voltages are deterministically bound. The topology includes potential for open loop operation due to the naturally bounded TX side operating voltages.

Adaptive self-resonant mode insures that the transceivers operate at resonance, which is the highest efficiency operation. The inherent zero voltage switching not only results in better efficiencies, but also lowers the EMI signature.

The core power circuit includes power FETs that are ground based for both the TX and RX side of the transceiver. Such a topology results in higher efficiency because currents flow through fewer FET switches. Further, the ground side based topologies simplify design of the gate drive controllers, resulting in simpler and more compact circuit layouts and printed circuit-board (PCB) layout.

The systems can be made WPC compliant. Such systems operate at a near constant operating frequency, which is conducive for automotive applications. A constant predetermined operating frequency is possible without addition of additional circuitry. Systems operating in AR mode can have virtually zero switching losses in the power stage. Power control is readily achievable over a wide dynamic range.

Figure 1:
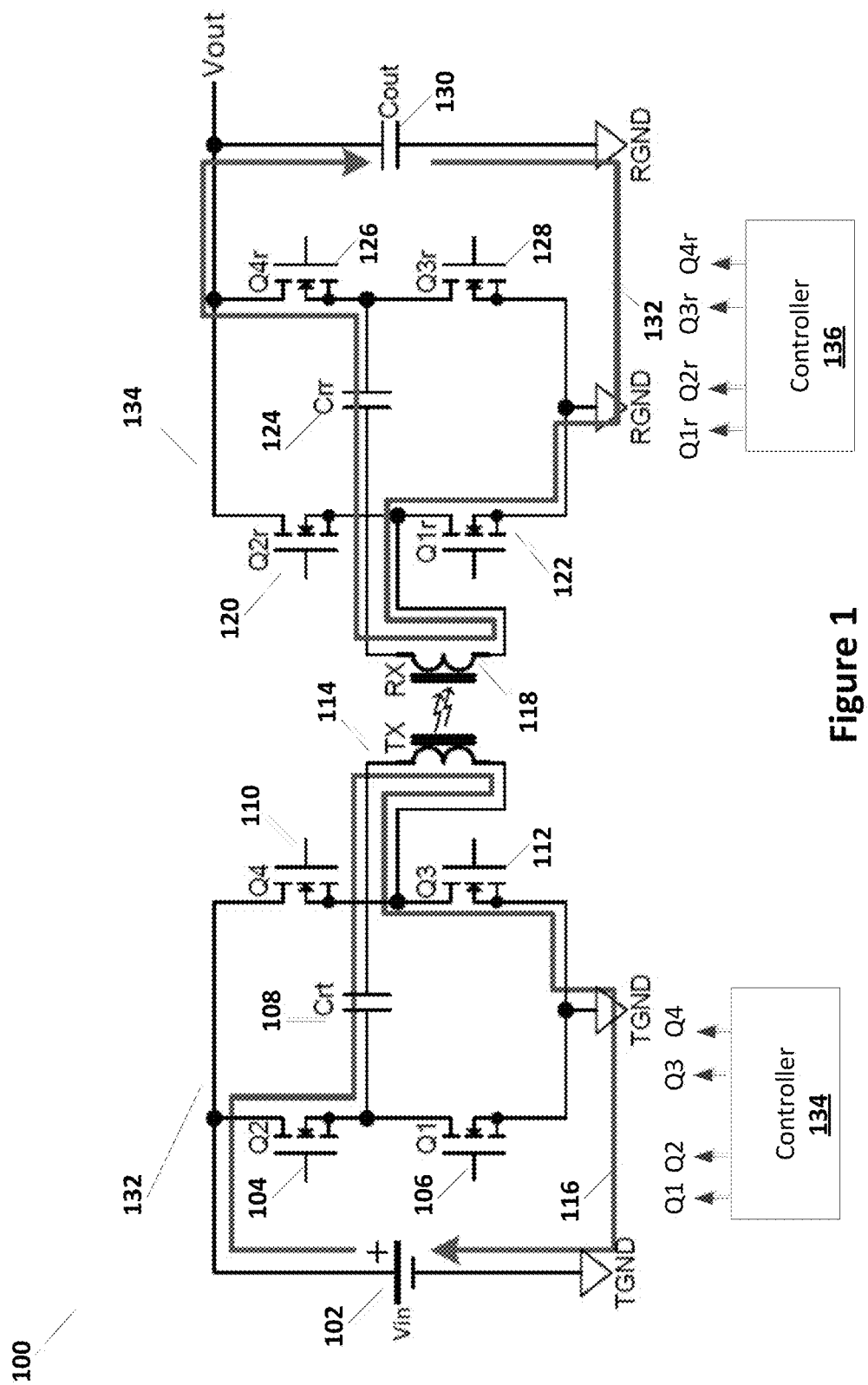
FIG. 1 illustrates a conventional wireless transmission system.
Figure 9:
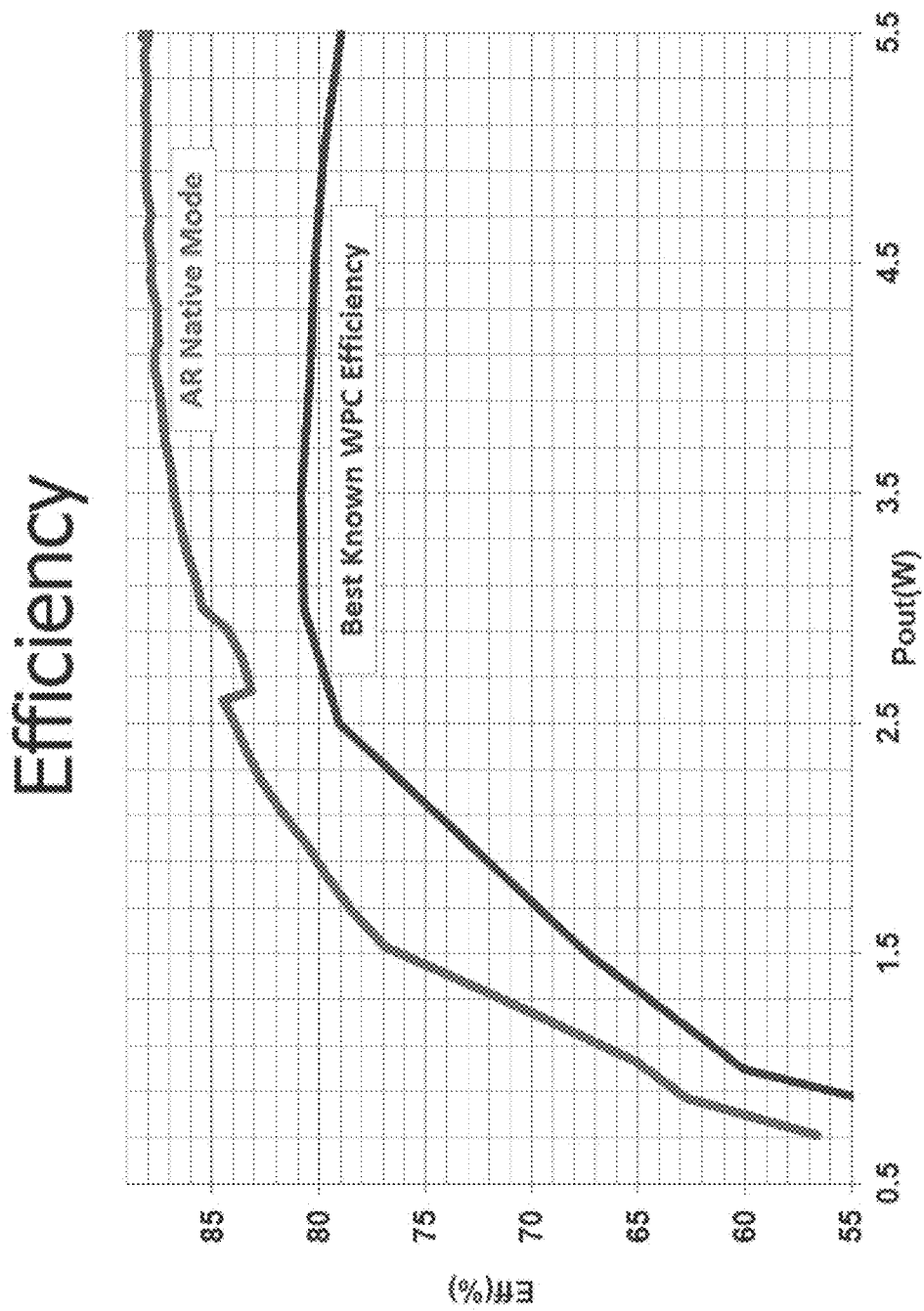
FIG. 9 illustrates a comparison of efficiencies between transceivers according to some embodiments and conventional transceivers.

FIG. 9 illustrates an efficiency curve of a transceiver such as transceiver system 200 shown in FIG. 2A in comparison with a conventional transceiver system such as system 100 shown in FIG. 1. As shown, transceiver system 200 can have a substantially higher efficiency than conventional transceiver systems.

Figure 10:
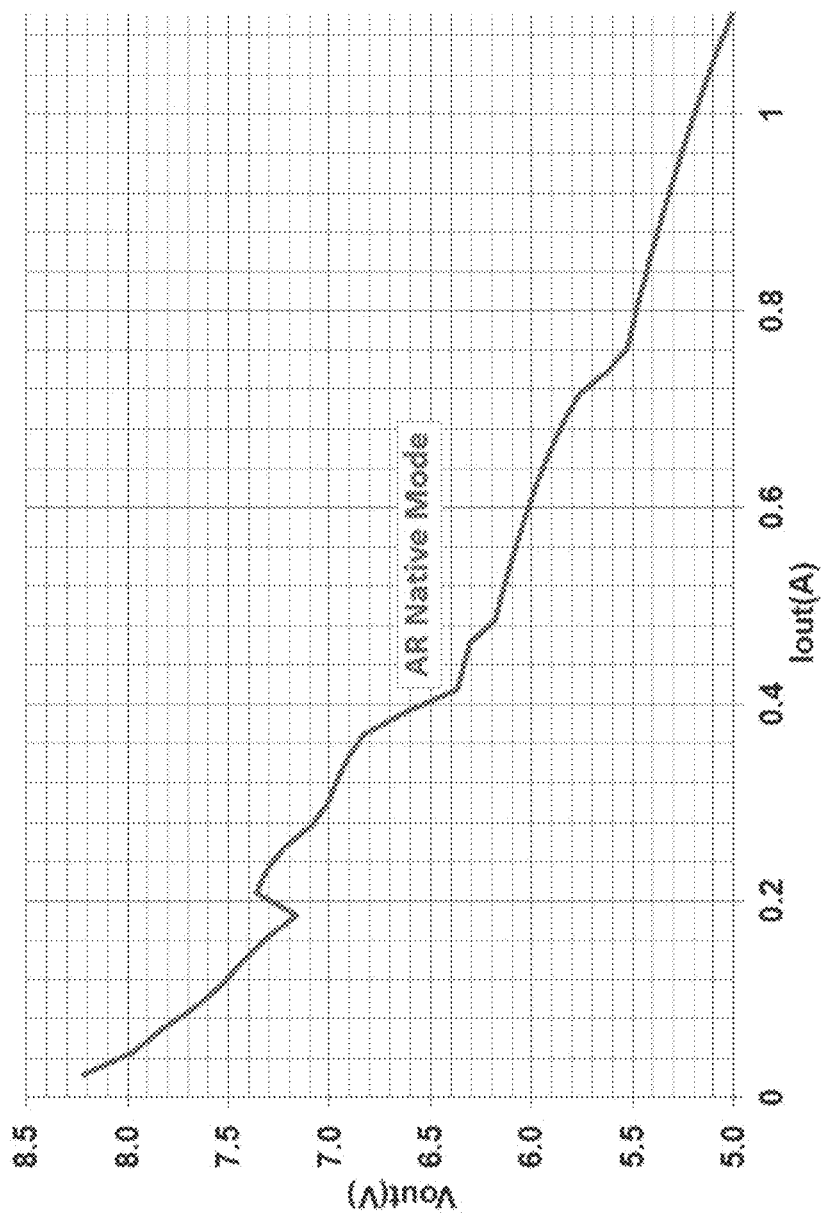
FIG. 10 illustrates the receiver voltage variation of a receiver according to some embodiments.

FIG. 10 illustrates the output voltage of a receiver 230 in a transceiver system 200 according to some embodiments. As is shown, the output voltage decreases with output current.

Figure 11A:
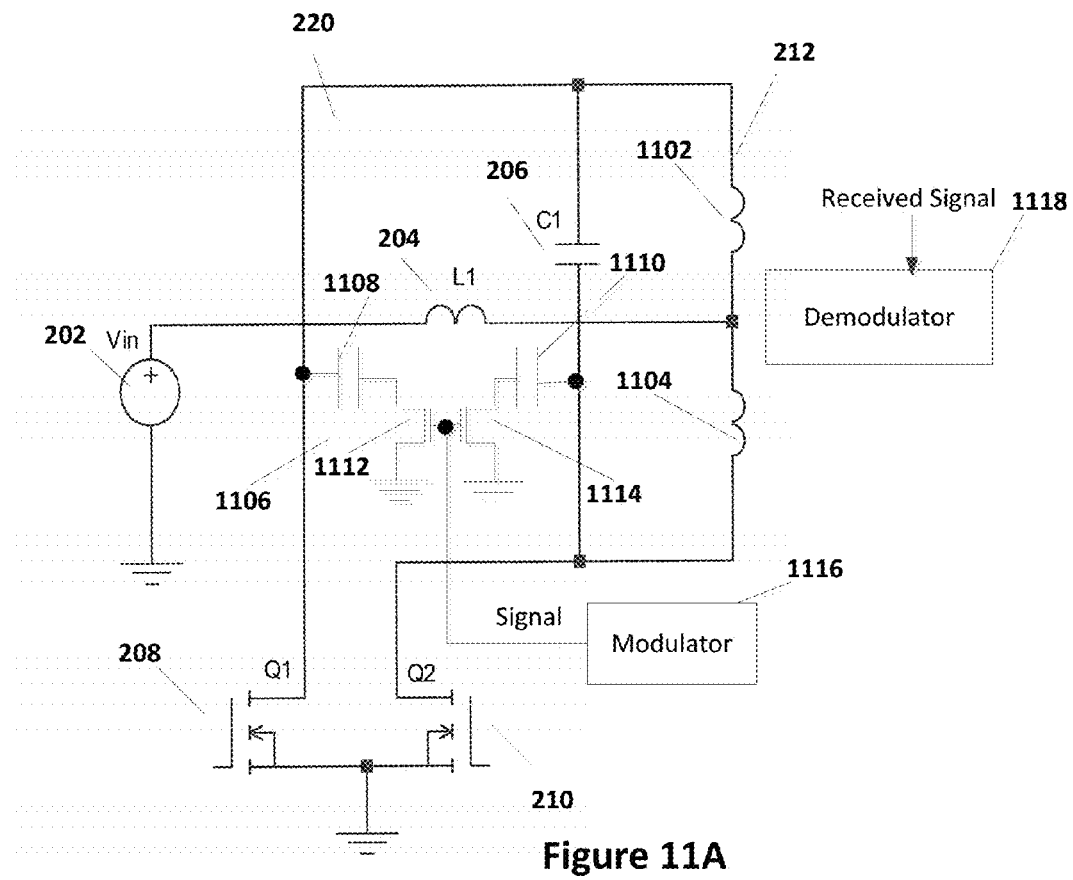
FIGS. 11A and 11B illustrates communications systems in the transmitters of a transceiver system according to some embodiments.
Figure 11B:
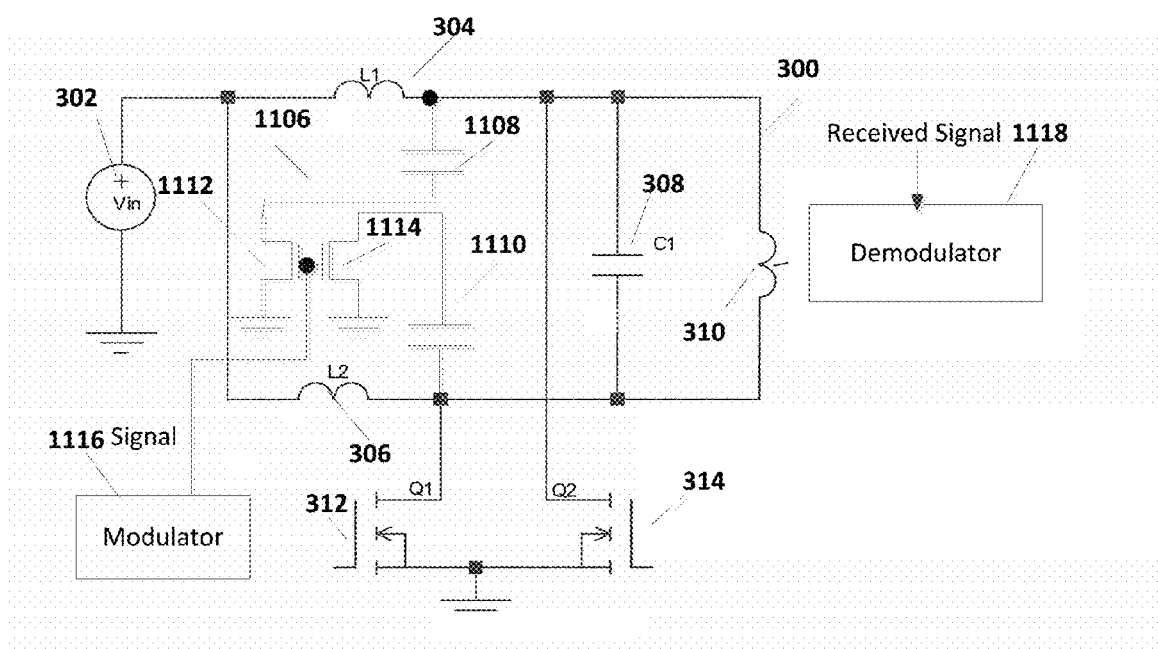

In some embodiments, frequency modulated (FM, FSK) communication is possible. For example, the controllers may receive communications that control the switching frequencies of the power FETs. Such a communication can be received from devices being charged or from other sources. Such communication can be more robust and readily lends itself to advanced digital demodulation without the need of any external components. FIGS. 11A and 11B illustrate frequency modulation of the power signal, which can be demodulated at the receiver in order to receive transmitted data.

FIG. 11A illustrates transmitter 220 as illustrated in FIG. 2A while FIG. 11B illustrates transmitter 300 illustrated in FIG. 3. As shown in FIG. 11A, a frequency shifting circuit 1106 is coupled between the drains of power FETs 208 and 210. Similarly, in FIG. 11B frequency shifting circuit 1106 is coupled between the drains of FETs 312 and 314. As illustrated in FIGS. 11A and 11B, frequency shifting circuit includes capacitors 1108 and 1110. Capacitor 1108 is coupled between the drain of power FET 208 in FIG. 11A (the drain of power transistor FET 314 in FIG. 11B) and the drain of FET 1112. Capacitor 1110 is coupled between the drain of power FET 210 in FIG. 11A (the drain of power FET 312 in FIG. 11B) and the drain of FET 1114. The sources of FETs 1112 and 1114 are coupled to ground. The gates of FETS 1112 and 114 are coupled together and to a modulator 1116. Modulator 1116 can encode digital data in the power signal that is transmitted by TX coil 212, which is represented by coils 1102 and 1104 in FIG. 11A. Switching capacitors 1108 and 1110 causes transmitter 220 and transmitter 300 operating in AR mode to shift frequencies because of the shift in the resonance frequency of the circuit. The resulting frequency shift encoded data can be demodulated from the power signal received at a receiver to recover the data.

As further discussed below, a similar modulator can be provided in the receiver circuit. Consequently, transmitters 220 and 300 may receive data from the corresponding data. As shown in FIGS. 11A and 11B, a demodulator 1118 can demodulate a signal originating at the TX coil 212 and 310 from feedback from the corresponding RX coil. The received signal can be received, for example, from the TX coils itself or from other areas of TX 220 or 300.

Figures 12A, 12B:
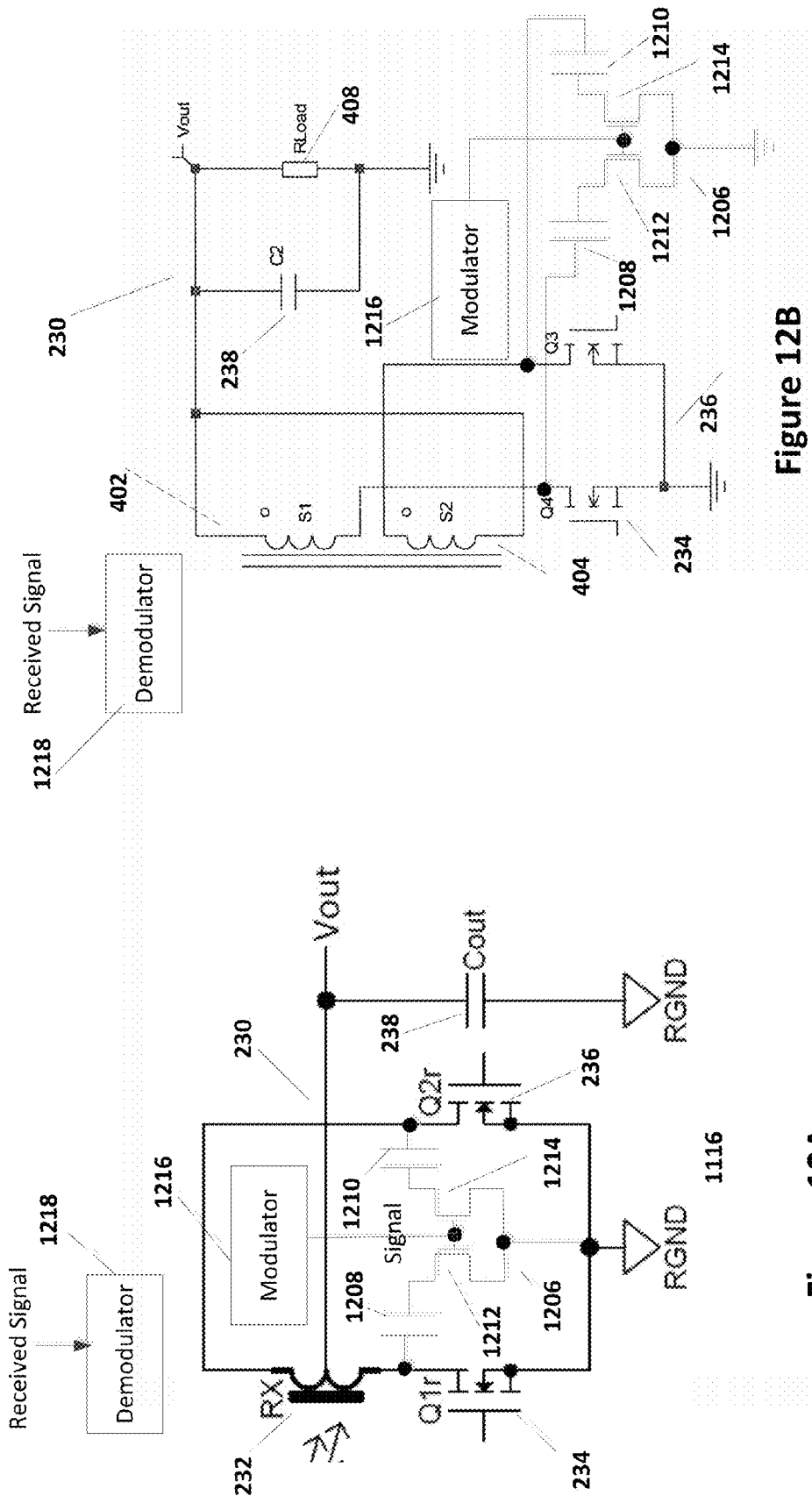
FIGS. 12A and 12B illustrates communications systems in the receivers of a transceiver system according to some embodiments.

FIGS. 12A and 12B illustrate modulation of data on the receiver side. FIGS. 12A and 12B illustrate embodiments of receiver 230, as discussed above. As shown in FIGS. 12A and 12B, a frequency modulation circuit 1206 is coupled between the drains of FETs 234 and 236. As shown, capacitor 1208 is coupled between the drain of FET 234 and a drain of FET 1212 while capacitor 1210 is coupled between the drain of FET 236 and the drain of FET 1214. The sources of transistors 1212 and 1214 are coupled to ground. The gates of FETs 1212 and 1214 are coupled and further coupled to modulator 1216, which provides a modulation signal corresponding to the digital data. As discussed above, the resonant frequency of RX 230 is altered by the switching of FETs 1212 and 1214, causing the AR frequency to shift accordingly. Further, demodulators 1218 can demodulated a signal originating from a corresponding transmitter. The received signal can be received at RX coil 232 or 402, for example.

In the detailed description above, specific details have been set forth describing certain embodiments. It will be apparent, however, to one skilled in the art that the disclosed embodiments may be practiced without some or all of these specific details. The specific embodiments presented are meant to be illustrative but not limiting. One skilled in the art may recognize other system or method that, although not specifically described herein, is still within the scope and spirit of this disclosure.

What is claimed is:

1. A transmitter for wireless power transfer, comprising:
   a TX coil;
   a capacitor coupled across the TX coil;
   at least one inductor coupled between a power source and the TX coil;
   a pair of switching FETs including a first switching FET coupled between a first side of the capacitor and ground and a second switching FET coupled between a second side, opposite the first side, of the capacitor and ground, the gates of the first switching FET and the second switching FET being driven to provide an oscillating current through the TX coil,
   wherein the gate of the first switching FET is switched from off to on and the gate of the second switching FET is switched from on to off when a first voltage across the second switching FET decreases to zero volts; and
   a resonant frequency shifting circuit coupled between drains of the first switching FET and the second switching FET, the resonant frequency shifting circuit being driven by a modulator.

2. The transmitter of claim 1, wherein the TX coil includes a center-tap, the inductor is coupled between the power source and the center tap, and the switching FETs have drains coupled to the first side and the second side of the capacitor.

3. The transmitter of claim 1, wherein the at least one inductor includes two inductors, a first inductor coupled between the power source and the first switching FET and a second inductor coupled between the power source and the second switching FET.

4. The transmitter of claim 1, wherein the gate of the second switching FET is switched from off to on and the gate of the first switching FET is switched from on to off when a second voltage across the first switching FET decreases to zero volts.

5. The transmitter of claim 1, further including a buck-boost circuit coupled between the power source and the at least one inductor.

6. The transmitter of claim 1, wherein data is transmitted from the transmitter to the receiver through resonant frequency shifts in power transmitted by the TX coil.

7. A method of wirelessly transmitting power, comprising:
   receiving DC power through one or more inductors; and
   switching the DC power to provide alternating current through a TX coil with a pair of power FETs coupled between opposite sides of the TX coil and ground such that current flows through one of the pair of FETs at a time,
   wherein switching the pair of power FETs to transmit power using the TX coil includes
      monitoring a voltage at a drain of a first FET of the pair of power FETs coupled to a first side of the TX coil, and
      switching the first FET from off to on and a second FET of the pair of power FETs from on to off when the voltage decreases to zero volts;
   driving, through a modulator, a resonant frequency shifting circuit coupled between drains of the power FETs to provide resonant frequency shifts in the TX coil; and
   transmitting data through the resonant frequency shifts in the power transmitted by the TX coil.

8. The method of claim 7, further including
   monitoring a second voltage at a drain of the second FET coupled to a second side of the TX coil; and switching the first FET from on to off and the second FET from off to on when the second voltage decreases to zero volts.

9. The method of claim 7, further including providing a buck-boost between the power source and the one or more inductors.

10. The method of claim 7, further including encoding digital data via the resonant frequency shifts of the transmitted power.

11. A transmitter for wireless power transfer, comprising:
a TX coil;
a capacitor coupled across the TX coil;
a pair of switching FETs including a first switching FET coupled between a first side of the capacitor and ground and a second switching FET coupled between a second side, opposite the first side, of the capacitor and ground, the gates of the first switching FET and the second switching FET being driven to provide an oscillating current through the TX coil;
at least one inductor coupled between a power source and the TX coil, wherein the at least one inductor includes two inductors, a first inductor coupled between the power source and a first drain of the first switching FET and a second inductor coupled between the power source and a second drain of the second switching FET; and
a resonant frequency shifting circuit coupled between drains of the first switching FET and the second switching FET, the resonant frequency shifting circuit being driven by a modulator.

12. The transmitter of claim 11, wherein the pair of switching FETs are driven in adaptive resonance mode.

13. The transmitter of claim 11, wherein the pair of switching FETs are driven at a resonant frequency or near the resonant frequency.

14. The transmitter of claim 11, further including a buck-boost circuit coupled between the power source and the at least one inductor.

15. The transmitter of claim 11, wherein data is transmitted from the transmitter to the receiver through resonant frequency shifts in power transmitted by the TX coil.

* * * * *